June 11, 1963  G. KINDER  3,093,043
PHOTOGRAPHIC CAMERA WITH ELECTRICAL EXPOSURE METER
Filed Nov. 24, 1961

INVENTOR
GOTTHARD KINDER
By Blum, Moscovitz, Friedman and Blum
Attorneys

United States Patent Office 3,093,043
Patented June 11, 1963

3,093,043
PHOTOGRAPHIC CAMERA WITH ELECTRICAL
EXPOSURE METER
Gotthard Kinder, Braunschweig, Germany, assignor to
Voigtlander A.G. Braunschweig, Germany, a corporation of Germany
Filed Nov. 24, 1961, Ser. No. 154,472
Claims priority, application Germany Dec. 3, 1960
8 Claims. (Cl. 95—10)

This invention relates to photographic cameras incorporating electric exposure meters whose indicator deflection is dependent upon the setting of one exposure factor and provides a measure for the setting of another exposure factor, and more particularly to an improved photographic camera of the type wherein the electric exposure meter includes a number of photo-electric cells which are selectively switched into and out of electric circuit connection with the indicating instrument of the exposure meter in accordance with the setting of an exposure factor.

An arrangement of this general nature has been proposed in a known type of motion picture camera. In this motion picture camera, the knob or other device for setting the film travel speed also operates a cam which is engaged by one end of a pivoted lever whose other end is in operative relation with a multiple contact spring biased switch. This switch controls the selective connection of a number, such as three, of photo-electric cells to the measuring instrument of the electric exposure meter. Thus, the number of such cells connected in circuit at any given time is proportional to the setting of the film travel speed. Consequently, for a constant value of ambient light, the indicator position of the measuring instrument is dependent upon the setting of the film travel speed. The diaphragm is set in accordance with the reading of the measuring instrument.

The known arrangement is rather complicated and cumbersome due to the relatively large number of relatively bulky parts required, the complicated circuit connections, the space required to accommodate the parts within the camera, and the positioning and adjustment required on account of the multiple parts included in the switching system. Consequently, this known arrangement is not at all suitable for use where space within the camera is at a premium or where economy in production of the camera is a factor.

In accordance with the present invention, an improved and simplified camera of this general type is provided wherein the variation of the deflection of the indicator in accordance with the setting of one exposure factor is effected in a greatly simplified manner. More particularly, selective switching of the photo-sensitive cells into and out of circuit relation with the indicating instrument of the exposure meter is effected by means of a contact strip cooperable with plural fixed contacts. Either the contact strip or the fixed contacts, and preferably the contact strip, are carried by the setting device for the particular exposure factor, and the other cooperating part of the sliding contact arrangement is positioned on a housing part of the camera directly adjacent such setting device.

An arrangement of this type is particularly adaptable to accommodation in the housing of a central shutter of a photographic camera. For example, in such an arrangement, a sliding contact strip is connected to the setting device for exposure time and cooperates with a plurality of spring contacts arranged in longitudinal alignment along the path of travel of the contact strip. These contacts are connected to the several photo-sensitive cells, or "partial cells", and to the measuring instrument, which is also connected commonly to the several photo-sensitive cells. By movement of the relatively elongated contact strip along the line of spring contacts, two or more of the several spring contacts may be interconnected, correspondingly to connect one or more of the several photo-sensitive cells in effective current supply relation to the indicating instrument of the exposure meter.

While the photo-electric cells can be positioned at various places on the camera or on the objective lens mount, an advantageous arrangement is provided by utilizing a single photo-sensitive cell, such as a selenium photo-sensitive cell, and subdividing the active area of this cell, in a known manner, into a plurality of smaller active areas separated from each other by parting lines, the resulting partial cells being arranged to be selectively connected into or disconnected from the input circuit of the single measuring instrument by operation of the exposure factor setting device.

The effective area of photo-sensitive cell surface connected to the measuring instrument at any given time is proportional to the setting of the controlling exposure factor. Thus, if the exposure factor setting device is changed from one setting step to another setting step in such a manner that the value of the exposure factor is either doubled or halved by such change, the resultant switching connects either double the previously connected active photo-cell surface or half the previously connected active photo-cell surface, respectively, to the measuring instrument. Consequently, the current supplied to the measuring instrument, under the same light condition, is either doubled or halved. This is by way of example only, as factors other than doubling or halving may be pertinent in any particular case.

For an understanding of the principles of the invention, reference is made to the following description of a typical embodiment thereof as illustrated in the accompanying drawings. In the drawings.

Figure 1:
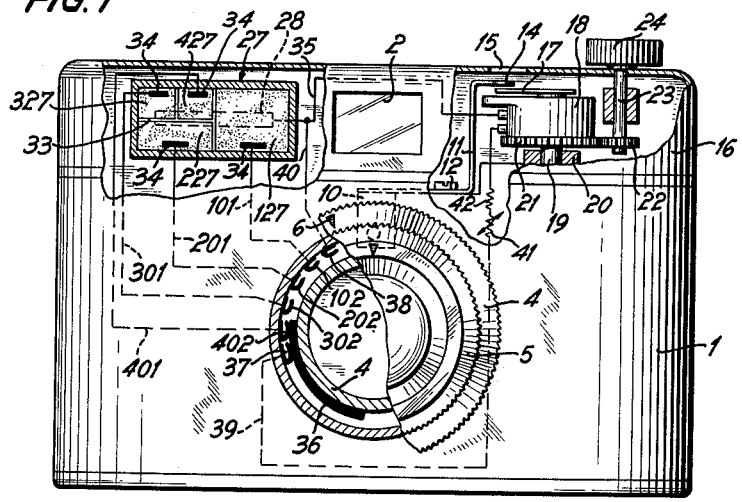
FIG. 1 is a somewhat schematic front elevational view, partly in section, of a photographic camera embodying the invention.
Figure 2:
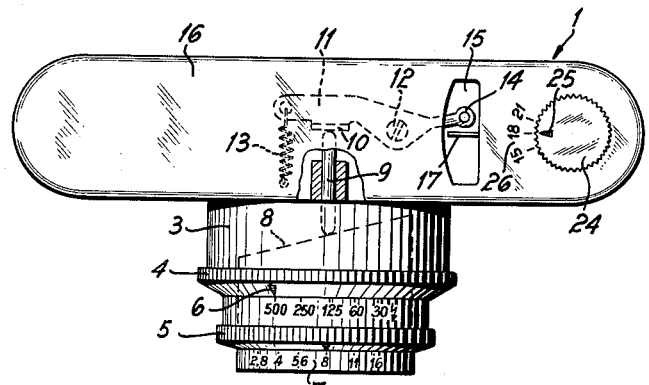
FIG. 2 is a top plan view, partly in section, of the photographic camera.

In FIGS. 1 and 2 of the drawing, a camera embodying the invention is illustrated as having a housing or casing 1 and a viewfinder 2. The objective lens and a central shutter are mounted in an objective lens mount 3 on which is mounted an exposure time setting ring 4 and the diaphragm aperture setting ring 5. Exposure time setting ring 4 carries a mark 6 which is adjustable with respect to a fixed scale of exposure time values, while the diaphragm setting ring 5 carries a mark which is cooperable with a fixed diaphragm aperture value scale 7. A cam 8, connected to the diaphragm setting ring 5 for rotation therewith, has one end of a slidably mounted feeler pin 9 engaging its cam surface, and the opposite end of feeler pin 9 engages a flange 10 of a lever 11 pivoted about a screw or the like 12 and biased to maintain engagement with the pin 9, and to maintain the pin 9 engaged with the cam 8, by means of a tension spring 13. Lever 11 has a portion formed as a resetting mark 14 which is visible in a window 15 in the camera hood 16.

Re-set mark 14 is cooperable with the indicator 17 of the measuring instrument 18 of an electric exposure meter. A pin 19, which is coaxial with the axis of rotation of indicator 17, is engaged in a bearing 20 so that measuring instrument 18 may be rotated as a unit. A spur gear 21 is fixed to the instrument 18 to rotate therewith, and this spur gear engages a pinion 22 fixed to a shaft 23 rotatably mounted in the camera housing. The shaft 23 projects through camera hood 16 and its outer end has a knurled knob 24 secured thereto. Knob 24 carries a mark 25 cooperable with a film sensitivity value scale 26 on hood 16. Thereby, measuring instrument 18, as a unit, can be turned with reference to scale 26 by means of knob 24.

The photo-sensitive cell, which supplies current to measuring instrument 18, is illustrated, by way of example, as mounted on the forward face of camera hood 16, and this photo-sensitive cell is designated, as a whole, by the reference numeral 27. Cell 27 is subdivided into partial cells 127, 227, 327 and 427. Of these cells, the light sensitive surface area of partial cell 127 constitutes one-half of the total light sensitive surface areas of cell 27. The light sensitive surface area of partial cell 227 is half that of partial cell 127. The light sensitive surface areas of partial cells 327 and 427 are equal, but are only one-quarter as large as that of the partial cell 127.

Figure 3:
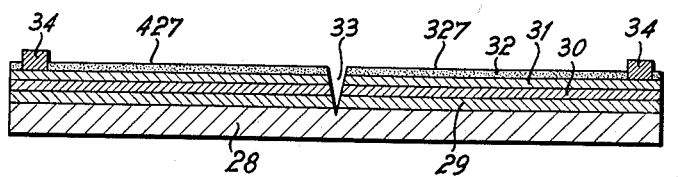
FIG. 3 is a sectional view through the photo-sensitive cell illustrating the sub-dividing thereof into partial cells.

Preferably, the subdivision of cell 27 into the partial cells is effected by means of forming parting lines, as by milling or the like, in the light sensitive surface of cell 27. Referring to FIG. 3, cell 27 comprises the usual electrically conductive base plate 28 on which is superposed a layer 29 of selenium. An intermediate layer 30 is disposed over layer 29, and a cover layer 31 is disposed over layer 30 and is covered by a lacquer coating 32. The parting lines 33, which may be produced by milling, extend through the several layers and into the base plate 28, thereby dividing that portion of the cell illustrated in FIG. 3 into the partial cells 327 and 427. One conductor of the circuit connecting the cells or partial cells to the measuring instrument 18 is connected to a base plate 28, and the other conductor of this electric circuit is connected in parallel to the contact strips 34, each of which is electrically connected to the cover layer 31.

Referring again to FIGS. 1 and 2, measuring instrument 18 is illustrated as connected to base plate 28 by means of a conductor 35. The contact strips 34 of the respective partial cells 127, 227, 327, and 427 are connected, by means of conductors 101, 201, 301 and 401, respectively, to respective spring contacts 102, 202, 302 and 402. These spring contacts are arranged in circumferentially spaced relation on the inner surface of the objective mount, and cooperate with a movable contact 36 which is in the form of a contact strip and is carried by the exposure time setting ring 4. A pair of spring contacts, 37 and 38, is also cooperable with the contact strip 36, these being disposed beyond either end of the series of contacts 102 through 402. A conductor 39 connects contact 37 to the measuring instrument 18, while a conductor 40 connects spring contact 38 to conductor 35. In a known manner, resistances 41 and 42 are included in the electric connection between spring contact 37 and measuring instrument 18. The length of sliding contact 36 is so selected that, at a selected position of ring 4, contact 36 will be in engagement with both contacts 37 and 38.

The described arrangement operates as follows. Knob 24 is turned until mark 25 is opposite the indication of scale 26 corresponding to the sensitivity of the film being used. This rotates the instrument 18 as a unit to give the instrument an initial angular orientation corresponding to the film sensitivity.

In the particular relation of parts illustrated in FIGS. 1 and 2, exposure time adjusting or setting ring 4 is set at a value of "1/500 sec." With this setting, the sliding contact 36 will be in engagement with spring contacts 37 and 402. Measuring instrument 18 thus receives photocell current only from the partial photo-cell 427, over the following circuit: Cell 427, conductor 401, contact 402, sliding circuit closer 36, contact 37, conductor 39, resistances 41 and 42, instrument 18, and conductor 35 back to the conductive base 28. The deflection of the indicator 17 of the instrument 18 is thus proportional, relative to the initial setting of the instrument 18 by adjustment of knob 24, to the amount of light incident upon the partial cell 427. The correct diaphragm setting for the available light conditions and the selected exposure time is effected by adjusting diaphragm ring 5 until the re-set mark 14 is brought into coincidence with the indicator 17. This may be effected, for example, when a diaphragm value "4" is set.

If the ring 4 is adjusted to an exposure time of "1/125 sec.," with the available light conditions remaining unchanged, the sliding contact strip 36 will engage spring contacts 37, 402, 302, and 202. This will connect the three partial cells 427, 327 and 227 into operative circuit relation with the instrument 18. The available light exposed cell area is thus quadrupled as compared to the area available with the setting of ring 4 at "1/500 sec.," and thus the available current to the instrument 18, assuming that the light conditions remain unchanged, is quadrupled. This will result in a different deflection of the indicator 17 of the instrument 18. Consequently, to bring the re-set mark 14 into coincidence with the indicator 17, the diaphragm adjusting ring 5 will have to be set to a different value, for example, a value of "8." The combination of the exposure time of "1/125 sec." and the diaphragm value of "8" is, however, equal to the previously set combination of "1/500 sec." and "4."

Should the exposure time adjusting ring 4 be set to a value of "1/60 sec." the circuit closure 36 will engage spring contacts 37, 402, 302, 202 and 102 so that the entire cell 27 is in circuit relation with the instrument 18. Thus, in changing the setting from "1/125 sec." to "1/60 sec.," the cell surface available to supply current to the counter 18 is doubled by connecting into circuit the partial cell 127.

If ring 4 is set to an exposure time of "1/30 sec.," the circuit closure 36 interconnects all of the contacts between and including the contacts 37 and 38. Thereby, the cell 27 is short circuited through conductor 35, conductor 40, contact 38, strip 36, and contacts 102, 202, 302, 402 and their associated conductors 101, 201, 301 and 401. Indicator 17 will thus occupy its zero position. The scene to be photographed can be illuminated by a flash unit, with the diaphragm apertures and distance setting being selected in keeping with the conductivity index.

In the particular example illustrated, the light sensitive surface area of photo-cell 27 is divided into partial cell areas in conformity with the graduation of the exposure time scale so that, when a given exposure value is changed to either twice the previous one or half the previous one, the useful area of cell 127 is either doubled or halved, respectively. If the setting values of a particular setting member scale are not either double or one-half the immediately adjacent value, the cell 27 can be subdivided in accordance with the variation from setting to setting of the particular scale. Should, for example, the setting value be altered by 75 percent between adjacent graduations, then the partial cell either to be included or excluded, depending upon the direction of adjustment of the setting member, is enlarged or reduced by 75 percent as compared with that available at the preceding setting. It should be further understood that control of the active cell surface available at any given time need not be affected by adjustment of the exposure time setting ring, but may also and alternatively be under the control of the diaphragm aperture adjusting ring.

It should be further understood that the invention is not restricted to the use of selenium photo elements, and the principles are equally applicable to other types of light measuring elements, such as silicon photo-cells or resistance photo-electric cells.

Furthermore, instead of the manual adjustment of re-setting mark 14 to set the second exposure factor in accordance with the deflection of indicator 17, mechanical scanning means of a known type may be used to set the second exposure factor automatically. It will be apparent that the described arrangement can readily be mounted in the mounts of conventional central type shutters.

While a specific embodiment of the invention has been shown and described in detail in order to illustrate the application of the principles of the invention, it will be understood that the invention may be embodied otherwise without departing from such principles.

What is claimed is:

1. In a photographic camera of the type including an exposure meter incorporating an electrical measuring instrument having an indicator whose deflection is controlled by the setting of a first exposure factor to provide an indication for controlling the setting of a second exposure factor, and including a plurality of photo-sensitive elements operatively associated with the measuring instrument and exposed to incident light, with each element being adapted to control the current supplied by itself to the measuring instrument in accordance with the light incident on the element, and means for switching the photo-sensitive elements into and out of circuit connection with the measuring instrument in accordance with the setting of such first exposure factor; the improvement comprising, in combination, a first setting device movable relative to an adjacent fixed surface of the camera for setting said first exposure factor; a plurality of contacts mounted on said adjacent fixed surface in aligned spaced relation along the path of movement of said first setting device; a contact strip on said first setting device elongated in the direction of movement of the latter and aligned with said contacts, the length of said contact strip being sufficient to span all of said contacts, whereby to engage and interconnect a number of said contacts increasing with movement of said first setting device in one first exposure factor setting direction and decreasing with movement of said first setting device in the opposite first exposure factor setting direction; means connecting said instrument in series between one of said contacts and one terminal of each of said elements; and means connecting the other terminal of each element to a respective one of the other of said contacts; whereby the number of elements selectively connected to said instrument will be varied in accordance with the setting of said first setting device.

2. The improvement in a photographic camera, as claimed in claim 1, in which the camera includes a central shutter and a housing for the central shutter; said first setting device being mounted on said central shutter housing; said adjacent fixed surface of said camera comprising a surface portion of said central shutter housing.

3. The improvement in a photographic camera, as claimed in claim 1, in which said contacts are spring contacts.

4. The improvement in a photographic camera, as claimed in claim 1, including a photo-sensitive cell having its photo-sensitive surface subdivided into partial cells each constituting one of said photo-sensitive elements; said photo-sensitive cell being a selenium photo-sensitive cell including an electrically conductive base plate having plural layers, including a layer of selenium thereon; said partial cells being formed by parting incisions extending through the layers to the base plate to mechanically separate the partial cells from each other.

5. The improvement in a photographic camera, as claimed in claim 1, including a second setting device for setting said second exposure factor; and a re-set mark coupled with said second setting device and constructed and arranged to be brought into coincidence with said indicator.

6. In a photographic camera, the improvement defined in claim 1, in which the first contact in such one setting direction is connected to said instrument and the second contact to one of said elements; said contact strip, in one terminal setting position of said first setting device, engaging and interconnecting said first and second contacts.

7. In a photographic camera, the improvement defined in claim 1, in which the first and last contacts in said one setting direction are connected directly and only to respective input terminals of said instrument; said contact strip, in the terminal position of said first setting device upon movement of the latter in such one setting direction, interconnecting all of said contacts whereby to shunt said elements.

8. In a photographic camera, the improvement as claimed in claim 6, in which the last contact in such one setting direction is connected directly and solely to said instrument; said contact strip, in the opposite terminal position of said first setting device, interconnecting said first and last contacts to shunt said elements.

References Cited in the file of this patent

UNITED STATES PATENTS

| | | |
|---|---|---|
| 2,186,613 | Mihalyi | Jan. 9, 1940 |
| 2,358,083 | Mihalyi | Sept. 12, 1944 |
| 2,943,545 | Fahlenberg | July 5, 1960 |
| 2,993,422 | Rentschler | July 25, 1961 |